(12) United States Patent
Bröker et al.

(10) Patent No.: US 6,688,799 B2
(45) Date of Patent: Feb. 10, 2004

(54) BALL-AND-SOCKET JOINT

(75) Inventors: Klaus Bröker, Bohmte-Hunteburg (DE); Reinhard Buhl, Bohmte (DE); Wolfgang Kleiner, Wagenfeld (DE); Martin Rechtien, Neuenkirchen-Vörden (DE)

(73) Assignee: ZF Lemforder Metallwaren AG, Dielingen (DE)

( * ) Notice: Subject to any disclaimer, the term of this patent is extended or adjusted under 35 U.S.C. 154(b) by 25 days.

(21) Appl. No.: 09/937,954

(22) PCT Filed: Feb. 9, 2001

(86) PCT No.: PCT/DE01/00517

§ 371 (c)(1),
(2), (4) Date: Sep. 28, 2001

(87) PCT Pub. No.: WO01/59313

PCT Pub. Date: Aug. 16, 2001

(65) Prior Publication Data

US 2002/0154941 A1 Oct. 24, 2002

(30) Foreign Application Priority Data

Feb. 9, 2000 (DE) .......................... 100 05 988

(51) Int. Cl.⁷ .............................................. F16C 11/06
(52) U.S. Cl. ..................... 403/135; 403/134; 403/133
(58) Field of Search ................. 403/122, 135, 403/134, 133

(56) References Cited

U.S. PATENT DOCUMENTS

| | | | |
|---|---|---|---|
| 2,861,827 A | 11/1958 | Langen et al. | |
| 3,273,923 A | * 9/1966 | Ulderup | 403/134 |
| 3,850,047 A | 11/1974 | Davis | |
| 4,013,298 A | * 3/1977 | Bjerk | 277/75 |
| 5,573,336 A | * 11/1996 | Maroney | 277/507 |
| 5,678,947 A | * 10/1997 | Urbach et al. | 403/134 |
| 5,697,142 A | * 12/1997 | Sugiura | 403/126 |
| 6,149,337 A | * 11/2000 | Newton et al. | 403/122 |

FOREIGN PATENT DOCUMENTS

| | | | | |
|---|---|---|---|---|
| DE | 670 444 | 5/1939 | | |
| DE | 844 234 | 7/1952 | | |
| DE | 26 25 507 | 12/1977 | | |
| DE | 196 39 626 | 3/1997 | | |
| EP | 82638 A1 | * 6/1983 | | F16C/11/06 |
| EP | 0 860 619 | 8/1998 | | |
| GB | 1 561 703 | 2/1980 | | |
| GB | 2 100 337 | 12/1982 | | |

* cited by examiner

Primary Examiner—Lynne H. Browne
Assistant Examiner—Ernesto Garcia
(74) Attorney, Agent, or Firm—McGlew and Tuttle, P.C.

(57) ABSTRACT

A ball-and-socket joint is provided with a joint housing which is open on at least one side with a housing recess, with a joint pin mounted in the housing recess with its joint ball provided with a surface protection. A pin section projects from a housing opening. A bearing shell is arranged between the joint housing and the joint ball. A sealing bellows is provided between the joint housing and the joint pin. A sealing element, which is under elastic pretension in sliding contact with the joint ball, is arranged between the joint housing and the joint ball.

13 Claims, 3 Drawing Sheets

BALL-AND-SOCKET JOINT

FIELD OF THE INVENTION

The invention relates to ball-and-socket joints, including joints for various purposes and more particularly is directed to ball-and-socket joints used in vehicle construction, in assembly units for the wheel suspension.

BACKGROUND OF THE INVENTION

Ball-and-socket joints are used in a great variety of areas, but especially in vehicle construction, in assembly units for the wheel suspension.

Such ball-and-socket joints comprise a joint housing with a housing recess, a joint pin, which is mounted in the housing recess with its joint ball provided with a surface protection and whose pin section projects from a housing opening. The joint ball is arranged in a bearing shell, which is necessary for the high loads acting on such joints in motor vehicles. Moreover, such ball-and-socket joints have a sealing bellows, which is provided between the joint housing and the joint pin.

It is quite essential for the long-term function (long-term service life) of the ball-and-socket joint to take design measures which make possible a permanent lubrication with joint grease. The friction between the components movable in relation to one another is considerably reduced as a result. A sealing bellows is used as the grease reservoir in prior-art joints.

However, the sealing bellows is also indispensable for the sealing of the joint components of ball-and-socket joints for motor vehicles against contamination and environmental effects.

Another problem concerning the optimal functions of joints arises from the fact that motor vehicles are frequently cleaned with high-pressure cleaning units. It was observed that these units generate pressures which are able to lift off the sealing bellows from the joint components at least briefly and slightly. Leaks occurring as a result make possible the entry of undesired media into the interior of the joint.

SUMMARY AND OBJECTS OF THE INVENTION

The technical object of the present invention is to achieve improved sealing of the ball-and-socket joint against the penetration of contaminants or moisture between the bearing shell and the joint ball with optimized lubrication function of the movable joint components at the same time.

According to the invention, a ball-and-socket joint is provided with a joint housing which is open on at least one side with a housing recess, with a joint pin mounted in the housing recess with its joint ball provided with a surface protection. A pin section projects from a housing opening. A bearing shell is arranged between the joint housing and the joint ball. A sealing bellows is provided between the joint housing and the joint pin. A sealing element, which is under elastic pretension in sliding contact with the joint ball, is arranged between the joint housing and the joint ball.

It is essential for the practical applicability of the present invention to provide the joint ball with a surface protection. Surface protection allows for an extremely low roughness as well as corrosion protection as a consequence of this treatment. This guarantees a long service life of the sealing lip which is in sliding contact with the joint ball. The maximum surface roughness (Ry) should be approximately between 1 $\mu$m and 5 $\mu$m.

The present invention offers a number of advantages. Thus, two different types of grease can be used within the ball-and-socket joint without mixing having to be feared. A first type of lubricating grease with optimal lubricating and sliding properties is provided between the joint ball and the bearing shell, the sealing lip sealing the reservoir and holding it in this area of the joint. A second type of grease is accommodated in the sealing bellows and assumes mainly a sealing function.

The additional sealing element within the ball-and-socket joint thus guarantees not only optimal lubrication of the joint, but also an optimal sealing function at the same time, which is of considerable advantage over prior-art designs especially in case of the use of high-pressure cleaning units.

A ball-and-socket joint according to the present invention may sometimes even do entirely without a sealing bellows. At any rate, the efforts needed to achieve firm seating of the sealing bellows can, however, be reduced, so that it appears to be possible to eliminate the use of straining rings, as a result of which not only the number of components present, but also the efforts needed during the assembly of the ball-and-socket joints according to the present invention and consequently also the costs can be reduced.

Advantageous variants of the present invention may be provided. Thus, provisions are made corresponding to another embodiment of the present invention for the sealing element to be designed as a ring made in one piece with the bearing shell, which ring establishes a sealing connection between the surface of the joint ball and the inner surface of the housing recess on the side of the housing opening. Such a sealing element design makes possible sealing between the joint ball and the joint housing in a simple manner, and the sealing element may be a sealing ring which is vulcanized or bonded on the open side of the bearing shell or a sealing ring prepared in one piece with the bearing shell according to the two-component method.

However, it is also possible to use as the sealing element a sealing lip which is injection-molded directly on the joint housing on the side of the housing opening or on the bearing shell or a sealing lip clamped between the bearing shell and the inner surface of the housing recess, the sealing lip being in contact with the joint ball under elastic pretension. The sealing lip has a cross section tapering to a tip, so that it causes a wiping effect on the joint ball with its tip.

The sealing element may consist of a thermoplastic material, e.g., POM, PUR, polyamide (PA), rubber or other elastomer materials, which makes possible both its simple manufacture and its simple connection to the joint housing and the bearing shell.

Furthermore, it is advantageous for the sealing surface of the sealing element which is in contact with the joint ball to have an additional coating consisting of a low-friction material. This may be, e.g., teflon or another suitable material.

In addition, it is possible in the case of a ball-and-socket joint according to the present invention to artificially embrittle the sealing surface of the sealing element being in contact with the joint ball after its preparation, which improves especially the sealing effect as a consequence of the resulting enlargement of the surface.

To avoid the introduction of contaminants into the area between the bearing shell and the joint ball, it is, furthermore, advantageous to provide a smooth transition from the joint ball to the pin section of the joint pin, i.e., to keep the radius R of transition between the joint ball and the pin section of the joint pin at a minimum. There shall be no flute in this area according to the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The figures show as an example a ball-and-socket joint known from the state of the art as well as two ball-and-socket joints according to the present invention.

Figure 1:
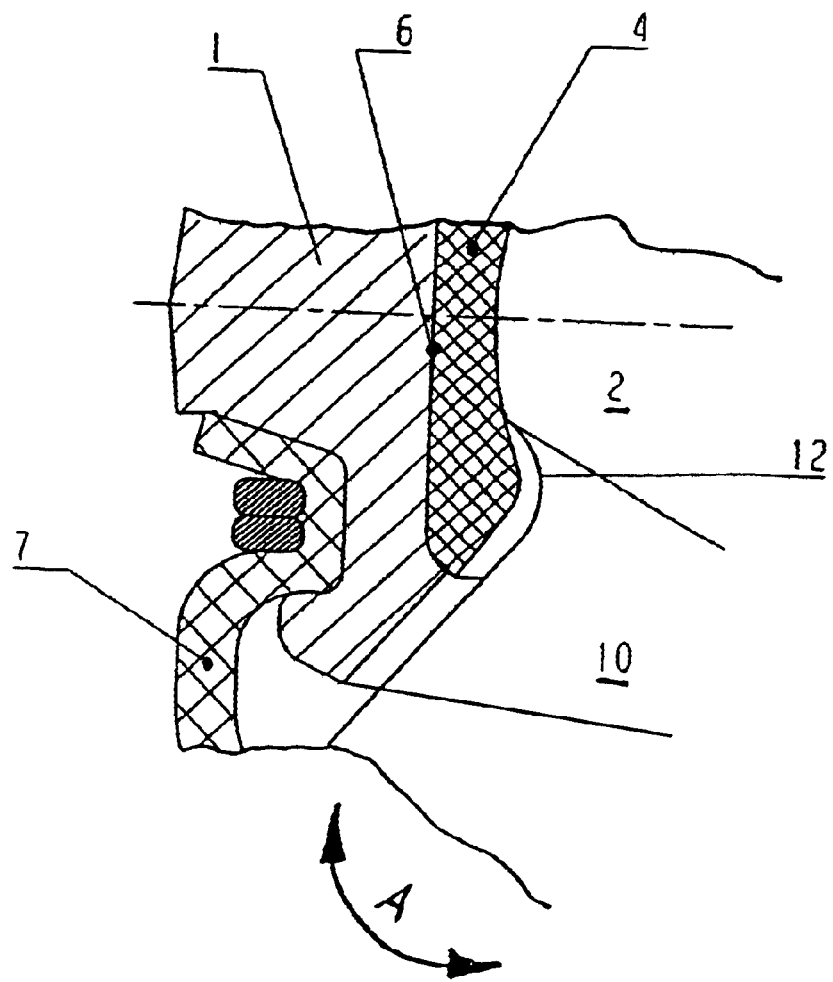
FIG. 1 is a sectional view of a detail of a ball-and-socket joint according to the state of the art.

FIG. 1 shows prior-art embodiments, which have especially the drawback that a flute 12 is present in the transition area between the joint ball 2 and the pin section of the joint pin 10. During its movement, the joint pin 10 pivotable in the direction of arrow A transports contaminants, which are present in the said flute 12, directly into the bearing surface between the bearing shell 4 and the joint ball 2, which clearly appears from the view in FIG. 1.

Figure 2:
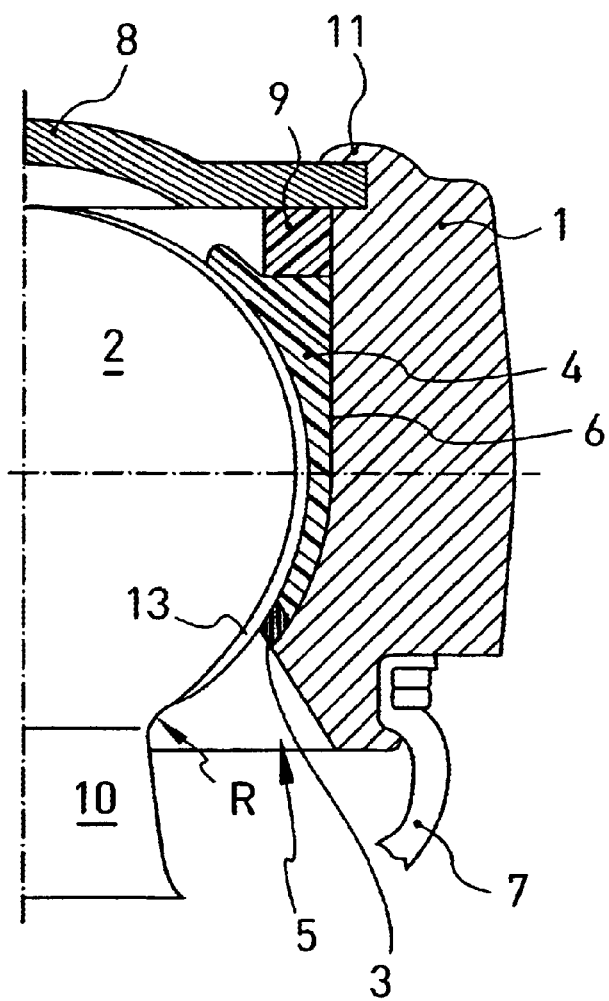
FIG. 2 is a sectional view of a detail of a ball-and-socket joint according to the present invention.
Figure 3:
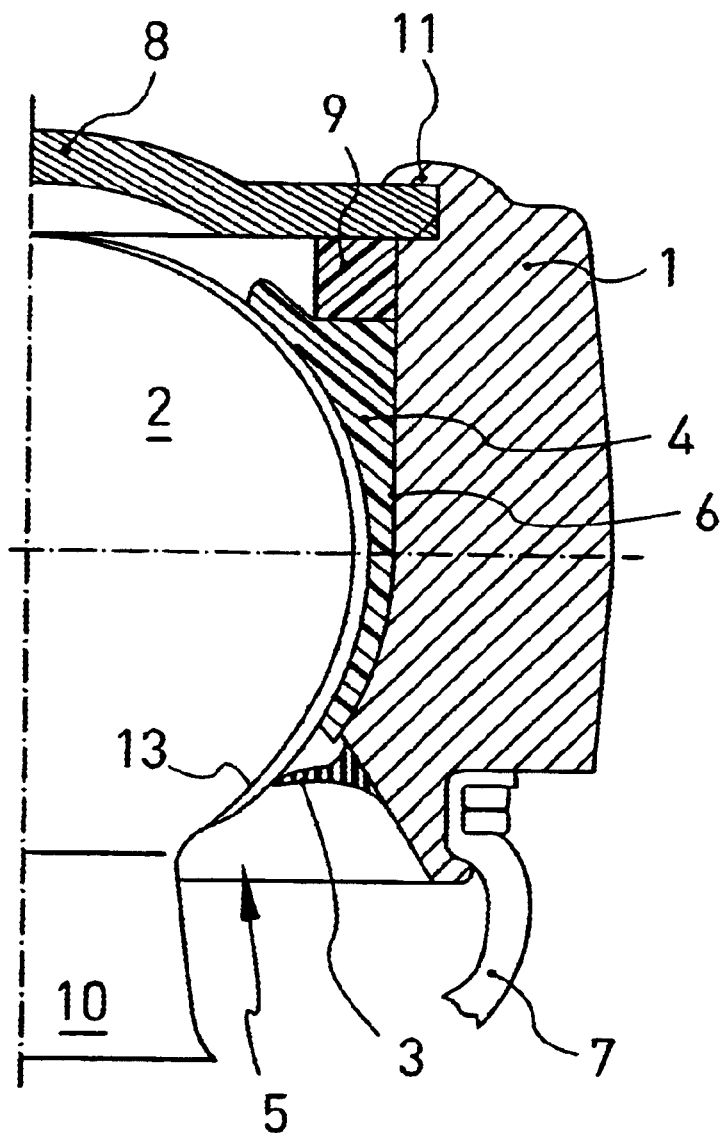
FIG. 3 is a sectional view of a detail of another ball-and-socket joint according to the present invention.

A joint ball 2 of a joint pin 10, which joint ball is provided with a surface protection 13, is arranged in the housing recess 6 of a joint housing 1 according to the present invention which is shown in FIGS. 2 and 3. The joint ball is mounted in the bearing shell 4 movably in a plurality of directions of movement. The bearing shell 4 is likewise inserted into the housing recess 6. A sealing bellows 7 is used as a grease reservoir and to seal the movable ball-and-socket joint components against the environment. It is in contact with the joint housing 1, on the one hand, and with the joint pin 10, on the other hand. The joint housing 1 is provided with a housing opening 5 on the side on which the pin exits. Opposite this housing opening, it is closed with a closing cover 8. This cover is fixed in the joint housing 1 by the deformation of the material of a housing edge 11. To fix the position of the bearing shell 4, a tolerance ring 9 is inserted between the closing cover 8 and the bearing shell 4.

In the embodiment according to FIG. 2, a sealing element 3 in the form of a sealing ring, which is in sliding contact with the surface of the joint ball under elastic pretension and is a rubber ring, is vulcanized to the bearing shell 4 on the housing opening side 5 of the joint housing 1.

In contrast, the embodiment in FIG. 3 shows as the sealing element 3 a sealing lip which is vulcanized to the joint housing 1 and is in contact with the surface of the joint ball under elastic pretension. Both embodiments of a ball-and-socket joint according to the present invention have an extremely small radius in the transition area between the joint ball 2 and the pin section of the joint pin 10, so that a flute is avoided in this area.

While specific embodiments of the invention have been shown and described in detail to illustrate the application of the principles of the invention, it will be understood that the invention may be embodied otherwise without departing from such principles.

What is claimed is:

1. A ball-and-socket joint comprising:
   a joint housing open on at least one side with a housing recess;
   a joint pin with a joint ball mounted in said housing recess, said joint ball being provided with a surface protection, said joint pin having a pin section projecting from a housing opening;
   a bearing shell arranged between said joint housing and said joint ball;
   a sealing bellows between said joint housing and said joint pin;
   a sealing element in sliding contact with said surface protection of said joint ball, said sealing element being under elastic pretension and being arranged between said joint housing and said joint ball, said sealing element being a sealing lip, which is injection molded to said bearing shell on a side of said housing opening and is in contact with said surface protection under elastic pretension.

2. A ball-and-socket joint in accordance with claim 1, wherein said sealing element is a ring made in one piece with said bearing shell and establishes a sealing connection between a surface of said joint ball and an inner surface of said housing recess on a side of said housing opening.

3. A ball-and-socket joint in accordance with claim 1, wherein said sealing element is a sealing ring made in one piece with said bearing shell according to a two-component method, said sealing element being a ring and establishing a sealing connection between said surface protection and an inner surface of said housing recess on a side of said housing opening.

4. A ball-and-socket joint in accordance with claim 1, wherein said sealing element is formed of a thermoplastic material.

5. A ball-and-socket joint in accordance with claim 1, wherein a sealing surface of said sealing element has a coating of a low-friction material.

6. A ball-and-socket joint in accordance claim 1, wherein a sealing surface of said sealing element is embrittled after its preparation.

7. A ball-and-socket joint in accordance with claim 1, wherein an outside diameter of said joint ball passes over smoothly into said pin section of said joint pin and a maximum surface roughness of said joint ball is between 1 $\mu$m and 5 $\mu$m.

8. A ball-and-socket joint in accordance with claim 4, wherein said thermoplastic material is one of polyoxymethylene (POM), polyamide (PA), polyurethane (PUR), rubber or elastomer material or a multicomponent elastic material.

9. A ball-and-socket joint in accordance with claim 1, wherein an outside diameter of said joint ball passes over into said pin section of said joint pin with a transition radius R between said joint ball and said pin section of said joint pin maintained at a minimum or not present at all.

10. A ball-and-socket joint in accordance with claim 1, wherein a maximum surface roughness (Ry) of the joint ball is between 1 $\mu$m and 5 $\mu$m.

11. A ball-and-socket joint comprising:
    a joint housing open on at least one side with a housing recess;
    a joint pin with a joint ball mounted in said housing recess, said joint ball being provided with a surface protection, said joint pin having a pin section projecting from a housing opening;
    a bearing shell arranged between said joint housing and said joint ball;

a sealing bellows between said joint housing and said joint pin;

a sealing element in sliding contact with said surface protection of said joint ball, said sealing element being under elastic pretension and being arranged between said joint housing and said joint ball, said sealing element being a sealing lip, which is injection molded on said joint housing on a side of said housing opening and being in contact with said surface protection under elastic pretension.

12. A ball-and-socket joint comprising:

a joint housing open on at least one side with a housing recess;

a joint pin with a joint ball mounted in said housing recess, said joint ball being provided with a surface protection, said joint pin having a pin section projecting from a housing opening;

a bearing shell arranged between said joint housing and said joint ball;

a sealing bellows between said joint housing and said joint pin;

a sealing element in sliding contact with said surface protection of said joint ball, said sealing element being under elastic pretension and being arranged between said joint housing and said joint ball, said sealing element is a sealing ring vulcanized to an open side of said bearing shell, said sealing ring establishing a sealing connection between said surface of protection and an inner surface of said housing recess on a side of said housing opening.

13. A ball-and-socket joint comprising:

a joint housing open on at least one side with a housing recess;

a joint pin with a joint ball mounted in said housing recess, said joint ball being provided with a surface protection, said joint pin having a pin section projecting from a housing opening;

a bearing shell arranged between said joint housing and said joint ball;

a sealing bellows between said joint housing and said joint pin;

a sealing element in sliding contact with said surface protection of said joint ball, said sealing element being under elastic pretension and being arranged between said joint housing and said joint ball, said sealing element being a sealing ring bonded to an open side of said bearing shell, said sealing ring establishing a sealing connection between said surface of protection and an inner surface of said housing recess on a side of said housing opening.

* * * * *